3,644,334
7-AZIDO-BENZODIAZEPINES
Robert Ye-Fong Ning, West Caldwell, and Leo Henryk Sternbach, Upper Montclair, N.J., assignors to Hoffmann-La Roche Inc., Nutley, N.J.
No Drawing. Filed Feb. 12, 1970, Ser. No. 11,022
Int. Cl. C07d 53/06
U.S. Cl. 260—239 BD    14 Claims

ABSTRACT OF THE DISCLOSURE 7-azido-benzodiazepines and processes for preparing the foregoing. Such 7-azido-benzodiazepines are useful as anticonvulsants, muscle relaxants and sedative agents.

DETAILED DESCRIPTION OF THE INVENTION

This invention relates to novel 5-aryl-1,4-benzodiazepines and novel processes for making the foregoing.

More particularly, the present invention relates to 5-aryl-1,4-benzodiazepines selected from the group consisting of pounds of the formula

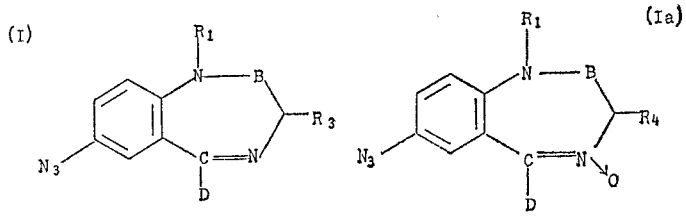

and pharmaceutically acceptable acid addition salts thereof wherein D is selected from the group consisting of

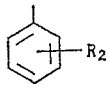 and 

B is selected from the group consisting of carbonyl and methylene; $R_1$ is selected from the group consisting of hydrogen, lower alkyl, hydroxy-lower alkyl, di-lower alkyl-amino-lower alkyl and $C_3$–$C_6$ cycloalkyl-lower alkyl; $R_2$ is selected from the group consisting of hydrogen, trifluoromethyl and halogen; $R_3$ is selected from the group consisting of hydrogen, lower alkyl, hydroxy and lower alkanoyloxy; and $R_4$ is selected from the group consisting of hydrogen and lower alkyl.

By the term "lower alkyl" as utilized herein either alone or in combination with another radical, there is intended both straight and branched chain $C_1$–$C_7$, preferably $C_1$–$C_4$ hydrocarbon groups, such as methyl, ethyl, propyl, isopropyl, butyl and the like.

By the term "lower alkanoyloxy" as utilized herein, there is intended $C_1$–$C_7$, most preferably $C_1$–$C_4$, lower alkyl carbonyloxy groups containing the acyl moiety of a lower alkanoic acid. Such lower alkyl carbonyloxy groups may be illustrated by acetoxy, propionyloxy, butyryloxy and the like. The term "halogen" as found herein connotes all four forms thereof, i.e., fluorine, chlorine, bromine, and iodine, unless otherwise indicated. The expression "di-lower alkyl-amino-lower alkyl" represents, for example, dimethylaminoethyl, diethylaminoethyl, diethylaminopropyl and the like. By the term "hydroxy lower alkyl" there is contemplated groups such as hydroxyethyl, hydroxypropyl, hydroxybutyl and the like. $C_3$–$C_6$ cycloalkyl utilized herein includes cyclopropyl, cyclobutyl, cyclopentyl and cyclohexyl. Thus, $C_3$–$C_6$ cycloalkyl-lower alkyl encompasses a group such as cyclopropylmethyl and the like.

The compounds of the Formula I above are prepared in a preferred process aspect by reacting a compound selected from the group consisting of a compound of the formula

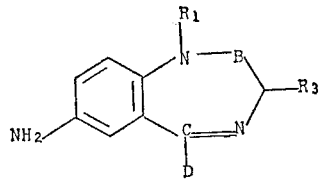

(II)

and a compound of the formula

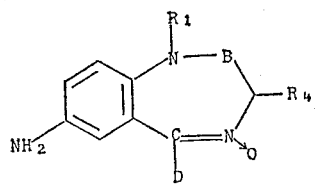

(IIa)

wherein B, D, $R_1$, $R_3$ and $R_4$ are as above or a pharmaceutically acceptable salt thereof with nitrous acid whereby to form a diazonium salt and thereafter treating the so-obtained diazonium salt with an alkali metal azide.

The first stage of the preferred process aspect occurs upon the treatment of a compound of the Formula II or IIa above with nitrous acid whereby to provide a diazonium salt. The formation of such diazonium salt is preferably affected by adding a compound of the Formula II or IIa above to a dilute mineral acid such as aqueous hydrohalic acid, aqueous hydrochloric acid, aqueous sulfuric acid and the like and then treating the so-prepared solution with nitrous acid. Conveniently, the nitrous acid is provided to the reaction zone by adding to the said solution, an aqueous solution of an alkali metal nitrite, preferably, sodium nitrite. Suitably, the nitrous acid treatment is carried out at or below room temperature. Thus, temperatures in a range from about between about −5° to about 25° C. are preferred. It is, of course, to be understood that the nitrous acid need not be provided to the reaction zone in the manner described above. The same end can be accomplished in a less preferred manner as follows:

A salt of a compound of the Formula II or IIa above (e.g., the hydrochloride, hydroiodide, the sulfate and the like) is added to a solvent such as an alcohol, e.g., methanol, ethanol and the like or a lower alkanoic acid such as acetic acid, propionic acid and the like. To the so-formed solution, there is added a lower alkyl nitrite such as methyl, ethyl or amyl nitrite.

Suitably the reaction is permitted to proceed at room temperature or below, preferably below room temperature. As above, temperatures of from about $-5°$ to about $25°$ C. are preferred.

The so-obtained diazonium salt is then treated with an agent capable of converting it into an azide of the Formula I or Ia above. Any reagent which is capable of reacting with the diazonium salt to effect its conversion into the corresponding compound of the Formula I above or Ia above is suitable for the purposes of the present invention. Representative of azide group providing agents are alkali metal azides, such as sodium azide, potassium azide, lithium azide, and alkaline earth metal azides such as calcium azide, ammonium azide and the like.

The conversion of the diazonium salt to a compound of the Formula I or Ia above is preferably effected at temperatures lower than room temperature, preferably at a temperature from about $-5°$ to about $25°$ C. Any agent which is capable of generating an azide ion so that the conversion of the diazonium salt of a compound of the Formula II or IIa above to the corresponding compound of the Formula I or Ia above is suitable for the purposes of the present invention. Certain of such suitable agents are indicated above. The preferred azide ion generating agent is sodium azide.

Azides of the Formulas I and Ia above wherein $R_1$ is lower alkyl, hydroxy lower alkyl, di-lower alkyl amino lower alkyl or cycloalkyl-lower alkyl can be prepared directly from the corresponding compounds of the Formulas II and IIa above.

In an alternate process embodiment, compounds of Formulas I and Ia above wherein B is carbonyl and $R_1$ is lower alkyl, hydroxy lower alkyl or di-lower alkyl amino lower alkyl can be prepared from the sodio derivatives of the corresponding compounds of the Formulas I and Ia above which are unsubstituted in position-1 (i.e., compounds of the Formulas I and Ia above wherein $R_1$ is hydrogen and B is carbonyl). The said sodio derivatives are of the formula (III) and (IIIa)

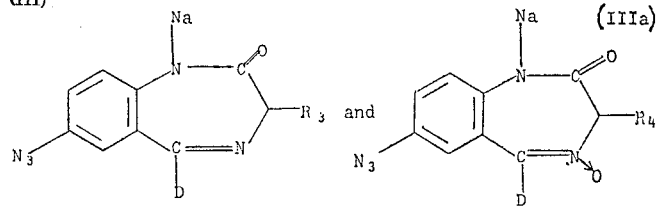

wherein D, $R_3$ and $R_4$ are as above.

Thus, compounds of the Formulas I and Ia above wherein R is lower alkyl can be prepared from the 1-sodio derivative of a compound of the Formula I or Ia above wherein $R_1$ is hydrogen by reacting such sodio derivative with an alkylating agent such as a lower alkyl halide, e.g., methyl iodide or methyl bromide or a di-lower alkyl sulfate such as dimethyl sulfate, diethyl sulfate and the like.

The treatment of said sodio derivatives of the Formulas III and IIIa above to obtain the corresponding compounds of the Formulas I and Ia above wherein $R_1$ is lower alkyl and B is carbonyl can be conducted in an inert organic solvent medium utilizing one or more inert organic solvents such as methanol, ethanol, dimethylformamide, benzene, toluene and N-methyl pyrrolidone and the like. Temperature and pressure are not critical. However, it is preferred to effect the reaction at about room temperature and atmospheric pressure or below.

To form the said 1-sodio derivative, conventional reagents such as sodium methoxide, sodium hydride or the like can be employed utilizing accepted prior art procedures.

Similarly, compounds of the Formula I or Ia above wherein $R_1$ is hydroxy lower alkyl and B is carbonyl can be prepared by treating the compounds of the Formula III or IIIa above with a reagent of the formula hydroxy-lower alkyl-X wherein X is selected from the group consisting of chlorine, bromine and iodine. The above reaction can be conducted in an inert organic solvent medium utilizing any conveniently available inert organic solvent such as dimethylformamide, tetrahydrofuran, dimethylsulfoxide, benzene, toluene and the like. Temperatures and pressures are not critical to a successful performance of this process step but it is preferred to conduct this reaction step at about room temperature or below.

Compounds of the Formula I or Ia above wherein $R_1$ is a dilower alkylamino-lower alkyl group and B is carbonyl can also be prepared from a compound of the Formula III or IIIa above by treating the last-mentioned compound with a compound of the formula

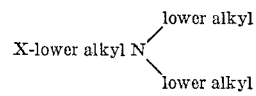

wherein X is as above.

The last-mentioned reaction can be conducted in an inert organic solvent medium utilizing one or more inorganic solvents such as methanol, dimethylformamide, tetrahydrofuran, benzene, toluene and N-methyl pyrrolidone. As above, in a preferred aspect, this reaction step is conducted at room temperature or below.

As is noted above, in addition to the compounds of the Formulas I and Ia above, there is also encompassed within the purview of the present invention, the acid addition salts thereof. The compounds of the Formulas I and Ia above form acid addition salts with pharmaceutically acceptable inorganic and organic salts such as hydrohalide acid, e.g., hydrochloric acid and hydrobromic acid, sulfuric acid, phosphoric acid, nitric acid, citric acid, ethane sulfonic acid, ascorbic acid, salicyclic acid and the like.

A preferred class of compounds included within the purview of the present invention are compounds of the Formulas I and Ia above wherein D is the group

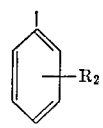

when $R_2$ is halogen, fluorine, particularly when joined to the 2-position of the 5-phenyl ring, is most preferred. Also preferred are those compounds of the formulas I and Ia above wherein $R_1$ is methyl. A preferred hydroxy lower alkyl group is hydroxyethyl. A preferred di-lower alkyl amino-lower alkyl group is diethylaminoethyl. The preferred cycloalkyl lower alkyl group is cyclopropylmethyl.

$R_3$ is preferaby hydroxy or hydrogen, most preferentially, hydrogen.

A particularly preferred class of compounds included within the purview of the present invention are compounds of the formula

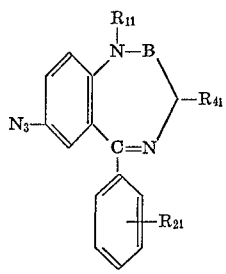

and pharmaceutically acceptable acid addition salts thereof wherein B is carbonyl or methylene; $R_{21}$ is selected from the group consisting of hydrogen and halogen and when halogen, most preferentially, fluorine; $R_{11}$ is selected from the group consisting of hydrogen, lower alkyl, preferably, methyl, hydroxy lower alkyl, preferably, hydroxyethyl and dilower alkylamino lower alkyl, preferably, diethylaminoethyl and $R_{41}$ is hydrogen or hydroxy, most preferentially hydrogen.

Compounds of the Formula I above and their pharmaceutically acceptable acid addition salts are useful as muscle relaxants, sedatives and anticonvulsants. As contemplated by this invention, the novel compounds of the Formula I and their acid addition salts can be embodied in pharmaceutical dosage formulations containing from about 1 to about 40 mgs. with dosage adjusted to species and individual requirements. The novel compounds of the present invention and their pharmaceutically acceptable salts can be administered internally for example parenterally or enterally in conventional pharmaceutical dosage forms. For example, they can be incorporated in conventional liquid or solid vehicles such as water, gelatin, starch, magnesium stearate, talc, vegetable oils and the like to provide tablets, elixirs, capsules, solutions, emulsions and the like according to acceptable pharmaceutical practices.

The reaction scheme is a preferred embodiment involves the diazoation of a compound of the Formula II or IIa above by conversion of the latter into the diazonium salt thereof, treating the resulting diazonium salt with an alkali metal azide such as sodium azide and then recovering the resulting product.

The following examples are illustrative but not limitative of the present invention. All temperatures are stated in degrees centigrade.

EXAMPLE 1

In a mixture of 2.5 ml. of 12 N HCl and 60 ml. water was dissolved 10 mmoles of the 7-amino-5-phenyl-3H-1,4-benzodiazepin-2(1H)-one. The solution was chilled in ice. An ice-cold solution of 759 mg. (11 mmoles) of sodium nitrite in 2.5 ml. water was added with stirring over 3 min. After 10 minutes at 0°, an ice-cold solution of 715 mg. (11 mmoles) of sodium azide in 2.5 ml. water was added in portions. There were instant precipitations of cream-colored solids accompanied by copious evolution of nitrogen. Stirring was continued for 1 hr. at 0°. The mixture was made basic (pH 13) with sodium hydroxide solution, then extracted with methylene chloride. The methylene chloride extracts were combined, washed with water dried and evaporated. Crystallizations from methylene chloride/hexane gave 7-azido-1,3-dihydro-5-phenyl-2H-1,4-benzodiazepin-2-one, M.P. 174–175° C.

EXAMPLE 2

In a mixture of 2.5 ml. of 12 N HCl and 60 ml. water was dissolved 10 mmoles of 7-amino-1,3-dihydro-5-(2-trifluoromethylphenyl)-2H-1,4-benzodiazepin-2 - one. The solution was chilled in ice. An ice-cold solution of 759 mg. (11 mmoles) of sodium nitrite in 2.5 ml. water was added with stirring over 3 minutes. After 10 minutes at 0°, an ice-cold solution of 715 mg. (11 mmoles) of sodium azide in 2.5 ml. water was added in portions. There were instant precipitations of cream-colored solids accompanied by copious evolution of nitrogen. Stirring was continued for 1 hr. at 0°. The mixture was made basic (pH 13) with sodium hydroxide solution, then extracted with methylene chloride. The methylene chloride extracts were combined, washed with water, dried and evaporated. Crystallizations from methylene chloride/hexane gave 7-azido-1,3-dihydro-5-(2-trifluoromethylphenyl)-2H-1,4-benzodiazepin-2 - one, M.P. 178–179° C.

EXAMPLE 3

In a mixture of 2.5 ml. of 12 N HCl and 60 ml. water was dissolved 10 mmoles of 7-amino-5-(2-chlorophenyl)-3H-1-,4-benzodiazepin-2(1H)-one. The solution was chilled in ice. An ice-cold solution of 759 mg. (11 mmoles) of sodium nitrite in 2.5 ml. water was added with stirring over 3 minutes. After 10 minutes at 0°, an ice-cold solution of 715 mg. (11 mmoles) of sodium azide in 2.5 ml. water was added in portions. There were instant precipitations of cream-colored solids accompanied by copious evolution of nitrogen. Stirring was continued for 1 hr. at 0°. The mixture was made basic (pH 13) with sodium hydroxide solution, then extracted with methylene chloride extracts were combined, washed with water, dried and evaporated. Crystallizations from methylene chloride-hexane gave 7-azido-5-(2-chlorophenyl)-1,3-dihydro-2H-1,4-benzodiazepin-2-one, M.P. 186–187° C.

EXAMPLE 4

Preparation of 7-azido-2,3-dihydro-1-methyl-5-phenyl-1H-1,4-benzodiazepine

In a mixture of 2.5 ml. of 12 N HCl and 60 ml. water was dissolved 10 mmoles of 7-amino-2,3-dihydro-1-methyl-5-phenyl-1H-1,4-benzodiazepine - dihydrochloride. The solution was chilled in ice. An ice-cold solution of 759 mg. (11 mmoles) of sodium nitrite in 2.5 ml. water was added with stirring over 3 minutes. After 10 minutes at 0°, an ice-cold solution of 715 mg. (11 mmoles) of sodium azide in 2.5 ml. water was added in portions. There were instant precipitations of cream-colored solids accompanied by copious evolution of nitrogen. Stirring was contained for 1 hr. at 0°. The mixture was made basic (pH 13) with sodium hydroxide solution, then extracted with methylene chloride. The methylene chloride extracts were combined, washed with water, dried and evaporated. Crystallizations from petroleum ether gave 7-azido-2,3-dihydro-1-methyl-5-phenyl-1H-1,4-benzodiazepine, M.P. 80–82° C.

EXAMPLE 5

Preparation of 7-azido-1,3-dihydro-3-hydroxy-5-phenyl-2H-1,4-benzodiazepin-2-one A solution of 2.0 g. (6.7 mmoles) of 1,3-dihydro-3-hydroxy-7-nitro-5-phenyl-2H-1,4-benzodiazepin-2-one in 125 ml. dimethylformamide was hydrogenated under 1 atmosphere of hydrogen using 250 mg. of 10% palladium on carbon as catalyst. Catalyst was removed by filtration and solvent evaporated. After recrysallizations from acetonitrile, 7-amino-1,3-dihydro-3-hydroxy-5-phenyl-2H-1,4-benzodiazepin-2-one was obtained, M.P. over 320°.

In a mixture of 2.5 ml. of 12 N HCl and 60 ml. water was dissolved 10 mmoles of 7-amino-3-hydroxy-5-phenyl-1,3-dihydro-2H-1,4-benzodiazepin-2-one. The solution was chilled in ice. An ice-cold solution of 759 mg. (11 mmoles) of sodium nitrite in 2.5 ml. water was added with stirring over 3 minutes. After 10 minutes at 0°, an ice-cold solution of 715 mg. (11 mmoles) of sodium azide in 2.5 ml. water was added in portions. There were instant precipitations of cream-colored solids accompanied by copious evolution of nitrogen. Stirring was continued for 1 hr. at 0°. The mixture was made basic (pH 13) with sodium hydroxide solution, then extracted with methylene chloride. The methylene chloride extracts were combined, washed with water, dried and evpaorated. Crystallizations from tetrahydrofuran-hexane gave 7-azido-1,3-dihydro-3-hydroxy-5-phenyl-2H-1,4-benzodiazepin-2-one, M.P. 188–190° C.

EXAMPLE 6

Preparation of 7-azido-1,3-dihydro-5-phenyl-2H-1,4-benzodiazepin-2-one 4-oxide

A solution of 6.0 g. (20.2 mmoles) of 1,3-dihydro-7-nitro-5-phenyl-2H-1,4-benzodiazepin-2-one 4-oxide in 170 ml. tetrahydrofuran, containing 200 mg. platinum oxide was hydrogenated at 1 atmosphere for 1 hr. During this time, 7 - amino-1,3-dihydro-5-phenyl-2H-1,4-benzodiazepin-2-one 4-oxide precipitated.

After collection and washing with tetrahydrofuran, the catalyst was removed from the crude product by solution in hot dimethylformamide, followed by filtration. Addition of ethanol to the filtrate gave colorless amorphous solid. After recrystallization from dimethylformamide-ethanol, 7 - amino-1,3-dihydro-5-phenyl-2H-1,4-benzodiazepin-2-one 4-oxide was obtained, M.P. 274–274.5° C.

In a mixture of 2.5 ml. of 12 N HCl and 60 ml. water was dissolved 10 mmoles of 7-amino-1,3-dihydro-5-phenyl-2H-1,4-benzodiazepin-2-one 4-oxide. The solution was chilled in ice. An ice-cold solution of 759 mg. (11 mmoles) of sodium nitrite in 2.5 ml. water was added with stirring over 3 minutes. After 10 minutes at 0°, an ice-cold solution of 715 mg. (11 mmoles) of sodium azide in 2.5 ml. water was added in portions. There were instant precipitations of cream-colored solids accompanied by copious evolution of nitrogen. Stirring was continued for 1 hr. at 0°. The mixture was made basic (pH 13) with sodium hydroxide solution, then extracted with methylene chloride. The methylene chloride extracts were combined, washed with water, dried and evaporated. Crystallization from tetrahydrofuran/hexane gave 7-azido-1,3-dihydro - 5 - phenyl-2H-1,4-benzodiazepin-2-one 4-oxide, M.P. 186–188° C.

EXAMPLE 7

Preparation of 7-azido-1,3-dihydro-5-(2-fluorophenyl)-1-methyl-2H-1,4-benzodiazepin-2-one To a fresh solution of 12.53 g. (40 mmoles) of 1,3-dihydro-5-(2 - fluorophenyl) - 1 - methyl-7-nitro-2H-1,4-benzodiazepin-2-one in 80 ml. of 6 N hydrochloric acid was added at once, in one portion, a solution of 30.0 g. (132 mmoles) of stannous chloride dihydrate in 80 ml. of 6 N hydrochloric acid. The mixture was stirred vigorously at room temperature for 16 hrs., then basified with 50% aqueous potassium hydroxide to dissolve the tin salts. 7-amino-1,3-dihydro - 1 - methyl-5-(2-fluorophenyl)-2H-1,4-benzodiazepin-2-one, which formed was collected and washed thoroughly with water. After recrystallizations from tetrahydrofuran-hexane 7-amino-1,3-dihydro-1-methyl - 5 - (2-fluorophenyl)-2H-1,4-benzodiazepin-2-one was obtained, M.P. 202–204° C.

In a mixture of 2.5 ml. of 12 N HCl and 60 ml. water was dissolved 10 mmoles of 7-amino-1,3-dihydro-1-methyl-5-(2 - fluorophenyl)-2H-1,4-benzodiazepin-2-one. The solution was chilled in ice. An ice-cold solution of 759 mg. (11 mmoles) of sodium nitrite in 2.5 ml. water was added with stirring over 3 minutes. After 10 minutes at 0°, an ice-cold solution of 715 mg. (11 mmoles) of sodium azide in 2.5 ml. water was added in portions. There were instant precipitations of cream-colored solids accompanied by copious evolution of nitrogen. Stirring was continued for 1 hr. at 0°. The mixture was made basic (pH 13) with sodium hydroxide solution, then extracted with methylene chloride. The methylene chloride extracts were combined, washed with water, dried and evaporated. Crystallizations from ethylacetate/heptane gave 7-azido-1,3-dihydro-5-(2-fluorophenyl) - 1 - methyl-2H-1,4-benzodiazepin-2-one, M.P. 97–99° C.

EXAMPLE 8

Preparation of 7-azido-1,3-dihydro-1-methyl-5-phenyl-2H-1,4-benzodiazepin-2-one

To a stirred solution of 1.11 g. (4.0 mmoles) of 7-azido-1,3-dihydro - 5 - phenyl-2H-1,4-benzodiazepin-2-one in 20 ml. of molecular sieves-dried tetrahydrofuran, was added at room temperature, under nitrogen, 216 mg. (50% dispersion in oil, 5.0 mmoles) of sodium hydride. Stirring at room temperature was continued for 20 minutes after the hydrogen evolution had subsided. Methyl iodide (2.84 g., 20 mmoles) was injected in one portion. After 1 hr. stirring, salts were removed by filtration. Evaporation of the filtrate gave a gum, which was mixed with warm benzene (40°) then filtered again to remove some insoluble material. The residue after the evaporation of the benzene was dissolved in an acetone-hexane mixture. Slow evaporation of this solution in an open beaker gave 7-azido-1,3-dihydro-1-methyl-5-phenyl-2H-1,4-benzodiazepin-2-one as yellow prisms. After recrystallizations in the same manner from acetone-hexane, the melting point was found to be 122.5–124° C.

EXAMPLE 9

Preparation of 7-azido-1,3-dihydro-1-(2-hydroxyethyl)-5-phenyl-2H-1,4-benzodiazepin-2-one To a stirred solution of 1.39 g. (5.0 mmoles) of 7-azido-1,3-dihydro-5-phenyl - 2H - 1,4-benzodiazepin-2-one in 20 ml. of molecular sieves-dried tetrahydrofuran, was added at room temperature, under nitrogen, 360 mg. (50% dispersion in oil, 7.5 mmoles) of sodium hydride. About 5 minutes after hydrogen evolution subsided, 1.25 g. (10 mmoles) of 2-bromoethanol was injected. After 20 hrs. of stirring at room temperature, the mixture was poured into 100 ml. of water. The mixture isolated by extractions with methylene chloride was concentrated to a volume of about 5 ml. and transferred onto a column of 100 g. of silica gel (Grace, 100–200 mesh) packed in anhydrous ether. Elution with 750 ml. of anhydrous ether gave recovered starting material. Further elution with 750 ml. ether gave 7-azido-1,3-dihydro-1-(2-hydroxyethyl)-5-phenyl-2H-1,4-benzodiazepin-2-one, which after recrystallizations from benzene-hexane was recovered as light yellow needles, M.P. 158–159° C.

In a similar manner, 7-azido-1,3-dihydro-1-(2-diethylaminoethyl)-5-phenyl-2H-1,4-benzodiazepin - 2 - one was prepared from 2-diethylaminoethyl chloride and 7-azido-1,3-dihydro-5-phenyl-2H-1,4-benzodiazepin-2-one.

EXAMPLE 10

A tablet formulation containing the following ingredients:

| | Mg. |
|---|---|
| 7-azido-1,3-dihydro-5-phenyl - 2H - 1,4 - benzodiazepin-2-one | 10.0 |
| Lactose | 129.0 |
| Corn starch | 50.0 |
| Pregelatinized corn starch | 8.0 |
| Calcium stearate | 3.0 |
| Total weight | 200.0 | were prepared as follows:

(1) 7-azido-1,3-dihydro - 5 - phenyl-2H-1,4-benzodiazepin-2-one, lactose, corn starch and pregelatinized corn starch were mixed in a suitable mixer.

(2) The mix was passed through a Fitzpatrick comminuting machine fitted with #1A screen and with knives forward.

(3) The mixture was returned to the mixer and moistened with water to a thick paste. The moist mass was passed through a #12 screen, and the moist granules were dried on paper lined trays at 110° F.

(4) The dried granules were returned to the mixer, and the calcium stearate was added and mixed well.

(5) The granules were compressed at a tablet weight of 200 mg. using standard concave punches having a diameter of 5/16".

EXAMPLE 11

A capsule formulation containing the following ingredients:

| | Mg. |
|---|---|
| 7-azido-1,3-dihydro - 5 - phenyl-2H-1,4-benzodiazepin-2-one | 25.5 |
| Lactose | 159.5 |
| Corn starch | 30.0 |
| Talc | 5.0 |
| Total weight | 220.0 | were prepared as follows:

(1) 7-azio-1,3-dihydro - 5 - phenyl-2H-1,4-benzodiazepin-2-one, lactose and corn starch were mixed in a suitable mixer.

(2) The mixture was passed through a Fitzpatrick comminuting machine using a #1A screen and knives forward.

(3) The mixture was returned to the mixer and the talc added. It was blended well and filled into #4 two piece, hard gelatin capsules on a Parke Davis capsulating machine. (Any similar type capsulating machine may be used).

EXAMPLE 12

A suppository formulation containing the following ingredients:

| | Gm. |
|---|---|
| 7-azido-1,3-dihydro - 5 - phenyl-2H-1,4-benzodiazepin-2-one | 0.025 |
| Wecobee M [1] | 1.230 |
| Carnauba wax | 0.045 |
| Total weight | 1.300 |

[1] Synthetic cocoa butter.

were prepared as follows:

(1) The Wecobee M and the carnauba wax were melted in a suitable size glass lined container, mixed well and cooled to 45° C.

(2) 7-azido-1,3-dihydro - 5 - phenyl-2H-1,4-benzodiazepin-2-one, which had been reduced to a fine powder with no lumps, was stirred until completely and uniformly dispersed.

(3) The mixture was poured into suppository molds to yield suppositories having an individual weight of 1.3 gms.

(4) The suppositories were cooled and removed from molds. They were then individually wrapped in wax paper for packaging.

What is claimed is:

1. A compound selected from the group consisting of compounds of the formula

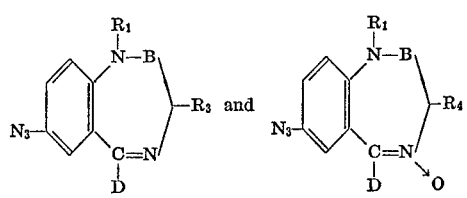

and pharmaceutically acceptable salts thereof wherein D is selected from the group consisting of

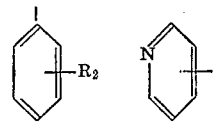

B is selected from the group consisting of carbonyl and methylene; $R_1$ is selected from the group consisting of hydrogen, lower alkyl, $C_3$–$C_6$ cycloalkyl lower alkyl, hydroxy lower alkyl and di-lower alkylamino lower alkyl; $R_2$ is selected from the group consisting of hydrogen and halogen; $R_3$ is selected from the group consisting of hydrogen, lower alkyl, hydroxy and lower alkanoyloxy and $R_4$ is selected from the group consisting of hydrogen and lower alkyl.

2. A compound as defined in claim 1 of the formula

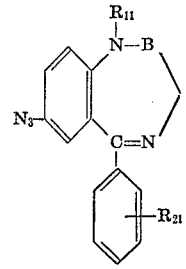

and pharmaceutically acceptable acid addition salts thereof wherein $R_{11}$ is selected from the group consisting of hydrogen, hydroxy lower alkyl, lower alkyl and di-lower alkyl amino lower alkyl; $R_{21}$ is selected from the group consisting of hydrogen and halogen and B is carbonyl or methylene.

3. A compound as in claim 2 of the formula

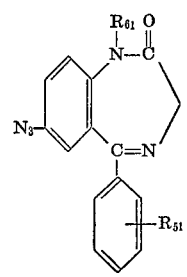

and pharmaceutically acceptable salts thereof wherein $R_{51}$ is selected from the group consisting of hydrogen and fluorine and $R_{61}$ is selected from the group consisting of hydrogen, methyl, hydroxyethyl and diethylaminoethyl.

4. A compound as in claim 1 of the formula 7-azido-1,3-dihydro-5-phenyl-2H-1,4-benzodiazepin-2-one.

5. A compound as in claim 1 of the formula 7-azido-5-(2-halophenyl)-1,3-dihydro - 2H - 1,4-benzodiazepin-2-one.

6. A compound as in claim 5 of the formula 7-azido-5-(2 - fluorophenyl)-1,3-dihydro-2H-1,4-benzodiazepin-2-one.

7. A compound as in claim 1 of the formula 7-azido-1,3-dihydro-1-lower alkyl-5-phenyl-2H-1,4-benzodiazepin-2-one.

8. A compound as in claim 7 of the formula 7-azido-1,3-dihydro-1-methyl-5-phenyl - 2H-1,4 - benzodiazepin-2-one.

9. A compound as in claim 1 of the formula 7-azido-1,3-dihydro-3-hydroxy-5-phenyl - 2H - 1,4-benzodiazepin-2-one.

10. A compound as defined in claim 1 of the formula 7 - azido-2,3-dihydro-1-Z-5-phenyl-1H-1,4-benzodiazepine wherein Z is selected from the group consisting of hydrogen and lower alkyl.

11. A compound as defined in claim 10 wherein Z is lower alkyl.

12. A compound as in claim 11 wherein Z is methyl.

13. A compound as in claim 1 of the formula 7-azido-1,3-dihydro - 1 - (2-hydroxyloweralkyl)-5-phenyl-2H-1,4-benzodiazepin-2-one.

14. A compound as defined in claim 13 of the formula 7 - azido - 1,3 - dihydro-1-(2-hydroxyethyl)-5-phenyl-2H-1,4-benzodiazepin-2-one.

References Cited

UNITED STATES PATENTS 3,144,439   8/1964   Reeder et al. _____ 260—239

ALTON D. ROLLINS, Primary Examiner

U.S. Cl. X.R.

260—141, 239.3 D, 294.8 C, 295 LB, 296 B; 424—244, 263